Patented Aug. 22, 1933

1,923,238

UNITED STATES PATENT OFFICE 1,923,238

PROCESS OF MAKING PURIFIED EXTRACTS FROM DRUGS CONTAINING DIGITALIS GLYCOSIDES

Walter Straub, Munich, Germany

No Drawing. Application February 5, 1931, Serial No. 513,780, and in Germany February 8, 1930

4 Claims. (Cl. 87—28)

This invention relates to a process of making purified extracts from drugs containing digitalis glycosides and consists essentially therein that suitable initial materials, for instance digitalis purpurea, convallaria and the like are at first subjected to a process of extraction by means of known organic extracting agents which are miscible with water, such as alcohol, acetone, methanol and the like which are diluted with water in such a ratio that the chlorophyll in the drug will just be prevented from participating in being dissolved and that the disturbing impurities are precipitated in a single working step by the aid of colloidal ferric hydrate.

My invention comprises further modifications of the aforementioned process, said modifications consisting in a specific production of the ferric hydrate which is used for precipitating the impurities and in eventually adding tri-sodium phosphate for eliminating the lime and iron and for neutralizing said extract.

The heretofore known processes for making purified extracts from drugs which contain heart-affecting glycosides are connected with the disadvantage that there will be large losses due to adsorption by some precipitates of any kind, such as is the case if the process is carried out by precipitating with lead and other precipitants.

This holds true especially for the effective substances which form part of digitalis purpurea, convallaria and the like so that recently a process of making such extracts by adsorption and subsequent eluation had been worked out in which process there is used adsorbing carbon for a glycoside from convallaria. (See W. Karrer, Helvetia Chimica, Acat Vol. III, page 506.)

My present invention is based upon the discovery that it is possible to extract the entire effective constituents from the aforementioned drugs quantitatively, if the extracts are made with the aid of a known extracting agent, such as alcohol, acetone, methanol and the like in such a manner that the chlorophyll is not extracted. This may be accomplished, for instance, by a proper ratio of mixing the extracting agent and water.

Thus, for instance, it had been found that a 45% acetone solution will extract all heart-affecting substances, but will not extract chlorophyll.

The process forming part of my present invention is further based upon the discovery that by means of a suitable precipitant the impurities may be removed from extracts in a single working step without loss of effective substance, if precipitation is carried out without varying the ratio of mixture of the water and the organic solvent in the extract.

In order to carry out the present process of making purified extracts from drugs which contain digitalis glycosides, according to my invention at first the respective drug is fully extracted in a percolator with the aid of an aqueous solution of an organic solvent, such as acetone, methyl or ethyl-alcohol in a ratio of mixture just suitable to prevent dissolution of the chlorophyll. Now the extract is treated with the colloidal ferric hydrate, the organic solvents being retained. For this purpose at first dry ferric chloride ($Fe_2Cl_6.6H_2O$) and after dissolution calcium carbonate in most finely pulverized condition is added. Now the formation of the colloidal ferric hydrate under liberation of carbonic acid and simultaneously therewith the desired precipitation takes place. When carrying out the process in this maner large quantities of organic impurities of the percolate, but no effective substance will be precipitated and after filtration there will be obtained a filtrate which is very little colored. The addition of ferric chloride will still serve another purpose and the ferric chloride is added in a surplus quantity relatively to those quantities necessary for the formation of the colloid. The effective glycosides of convallaria as well as in folia digitalis are bound, as known in the form of gluco-tannoides. The ferric chloride, the addition of which to the percolate produces an ink-darkening separates the chemical combination and liberates the glycosides. In this condition the glycosides will be rendered especially well soluble.

The filtrate obtained from the colloid precipitation still contains ferric compounds and calcium chloride which may be eliminated in the usual manner, preferably by addition of tri-sodium phosphate until neutral reaction takes place, ferric hydrate and lime being simultaneously precipitated. In the present case the color of the filtrate will become still lighter, said filtrate being ultimately a neutral solution of light yellow color. If necessary, now, the organic solvent may be evaporated in the vacuum at low temperature, or in like manner the product may be fully dried.

Example 1 kg. of herba convallaria is percolated with 5 liters of 45% acetone, and to the percolate there is added 150 g. of anhydrous ferric chloride and thereupon calcium carbonate is added under heavy stirring until development of carbonic acid ceases. For this purpose about 195 g. of calcium carbonate will be necessary. The mixture which is of black color is thereupon sharply filtered by means of a Nutsche funnel for one hour, the residue of filtration now consisting of 250 g. of dry subtance of which 60% consist of organic substance eliminated as impurity from the percolate. The filtrate is now liberated from lime by adding tri-sodium phosphate in most finely pulverized condition, the liberation of lime being completed, if neutral reaction takes place.

The process according to my invention may be simplified on account of the fact that it is not necessary to first percolate and thereupon add the ferric chloride. By treatment of the glycosides with ferric compounds said glycosides will be liberated from their tannine constituent and thus become easily soluble. The process may therefore also be carried out in such a manner that extraction and treatment with ferric chloride may be combined and carried out in a single working step.

The extracts produced according to my present process may be used in unchanged form. The extracts may also be used as initial material from which the effective constituents may further be isolated by shaking with an organic solvent, such as chloroform or a mixture of alcohol and chloroform in the well known manner.

I claim:

1. The process of making purified extracts from drugs containing digitalis glycosides, consisting in extracting suitable initial materials, such as digitalis purpurea, convallaria and the like with a solvent having a low boiling point and being neutral and an aliphatic organic in nature and diluted with water in such a ratio that the chlorophyll contained in the respective initial material will just be prevented from being dissolved; and precipitating thereafter the impurities present in the extract with the aid of colloidal ferric hydrate in a single step of operation.

2. A process as specified in claim 1, in which such an amount of tri-sodium phosphate is admixed to the mixture of the extract and the colloidal ferric hydrate that neutral reaction takes place whereby calcium and iron are simultaneously precipitated.

3. A process as specified by claim 1, in which the mixture of the extract and the colloidal ferric hydrate is filtered and thereafter such an amount of tri-sodium phosphate is admixed to the filtrate that neutral reaction takes place whereby calcium and iron are simultaneously precipitated.

4. A process as specified in claim 1, in which after the admixture of the colloidal ferric hydrate to the extract also tri-sodium phosphate is admixed to the same in the same vessel so as to have the precipitating action of this substance follow immediately the precipitating action of said hydrate.

WALTER STRAUB.